US010684774B2

(12) United States Patent
Alfut et al.

(10) Patent No.: US 10,684,774 B2
(45) Date of Patent: Jun. 16, 2020

(54) SYSTEMS AND METHODS FOR MULTIUSE OF KEYS FOR VIRTUAL KEYBOARD AND GENERATING ANIMATION ASSOCIATED WITH A KEY

(71) Applicant: Touchtype Ltd., London (GB)

(72) Inventors: Anna Maria Alfut, London (GB); Jan Dvorsky, London (GB); Tom Dixon, London (GB); Eric Davis Collins, London (GB); Donnie Javier Suazo Montenegro, London (GB); Scott D. Weiss, London (GB)

(73) Assignee: TOUCHTYPE LIMITED, London (GB)

( * ) Notice: Subject to any disclaimer, the term of this patent is extended or adjusted under 35 U.S.C. 154(b) by 781 days.

(21) Appl. No.: 14/813,005

(22) Filed: Jul. 29, 2015

(65) Prior Publication Data

US 2016/0070469 A1    Mar. 10, 2016

Related U.S. Application Data

(60) Provisional application No. 62/048,195, filed on Sep. 9, 2014.

(51) Int. Cl.
*G06F 3/048* (2013.01)
*G06F 3/0488* (2013.01)

(52) U.S. Cl.
CPC ............... *G06F 3/04886* (2013.01)

(58) Field of Classification Search
CPC ............ G06F 3/04817; G06F 3/04886; G06F 3/0482; G06F 3/0233; G06F 1/1662; G06F 1/1671

See application file for complete search history.

(56) References Cited

U.S. PATENT DOCUMENTS

| 2010/0070908 A1* | 3/2010 | Mori | G06F 3/0237 715/773 |
| 2011/0201387 A1* | 8/2011 | Paek | G06F 3/0237 455/566 |
| 2013/0307804 A1* | 11/2013 | Adachi | G06F 3/016 345/173 |
| 2015/0134642 A1* | 5/2015 | Chomley | G06F 3/04886 707/722 |

* cited by examiner

*Primary Examiner* — Phuong H Nguyen
(74) *Attorney, Agent, or Firm* — Schwegman Lundberg & Woessner, P.A.

(57) ABSTRACT

Systems, methods, and computer-readable storage media are described for generating a virtual keyboard user interface with at least one multi-state display portion. The user interface may include a plurality of keys of a virtual keyboard generated on a display, with at least one key among the plurality of keys having a first function. The user interface may also include a mnemonic device configured to be displayed on the virtual keyboard, where the mnemonic device may be irrelevant to the first function. The mnemonic device may have a first display state when the at least one key is not selected, and have a second display state when the at least one key is selected. In some aspects, the mnemonic device has a reduced visibility in the first display state and a heightened visibility in the second display state, so as to emphasize the second display state.

10 Claims, 5 Drawing Sheets

SYSTEMS AND METHODS FOR MULTIUSE OF KEYS FOR VIRTUAL KEYBOARD AND GENERATING ANIMATION ASSOCIATED WITH A KEY

CROSS REFERENCE TO RELATED APPLICATIONS

This application claims the benefit of U.S. Provisional Patent Application No. 62/048,195, titled SYSTEMS AND METHODS FOR MULTIUSE OF KEYS FOR VIRTUAL KEYBOARD AND GENERATING ANIMATION ASSOCIATED WITH A KEY, filed Sep. 9, 2014, the contents of which are incorporated herein by reference in their entirety.

TECHNICAL FIELD

The present disclosure relates to virtual keyboards and associating additional actions with the keys of a keyboard.

BACKGROUND

Animations associated with the use of a key typically relate to the key itself and the specific function that the key represents within a virtual keyboard. For example, the animation may highlight a key or the character symbols on a key when the key is pressed or the key may move in some way, such as appearing to be pressed down, so a user knows that the key has been selected. Other animations associated with virtual keys include making a key glow for some period of time, resizing the key, etc. It is also known to place a brand associated with a virtual keyboard somewhere on the keyboard, such as an unused area of the keyboard or on the spacebar. When branding is included on a key, the key (or characters on the key) on which the brand is displayed either does not change when the key is pressed or the key/character changes in some manner, such as the color of the key, and the brand changes in exactly the same manner as the key/character. In other words, the brand acts in exactly the same manner that other characters or symbols on other keys act when those keys are utilized in some way.

Virtual keyboards often include associated predictive technology that predicts next characters or words for use by a user, suggests or automatically corrects entries, and/or suggests or automatically completes certain words or phrases. Predictive keyboards present the one or more candidates/corrections/completions in a variety of ways, such as a candidate button at the top of the keyboard. Selecting a candidate button will insert the candidate into the text area of the display or possibly replace text already on the display, e.g., if a correction or completion.

SUMMARY

Systems, methods, and computer readable storage media are described for associating a logo and/or word marks (e.g. a brand) with one or more keys and animating the brand when the one or more keys are selected by a user.

Systems, methods, and computer readable storage media are also described for visually identifying one or more keys that are shared with a candidate button such that a user pressing one of the visually identified keys or pressing the candidate button would both cause the candidate to be inserted into the text area.

DETAILED DESCRIPTION OF ILLUSTRATIVE EMBODIMENTS

Embodiments of the present disclosure increase the visibility of a brand associated with a virtual keyboard. The virtual keyboard may be incorporated into any of a number of computing devices, as further described with respect to FIG. 3 below, such as a smartphone, a tablet, a laptop or other device that has a touchscreen display or other form of input/output device that allows a user to enter information from a display screen that displays one or more soft keys, meaning keys generated through software or firmware operating in association with the device.

Many computing devices come with a pre-installed virtual keyboard for enabling a user to interact with the device and use various applications operating on the device. Whether the manufacturer of the device also manufactured the virtual keyboard or obtained the virtual keyboard from a vendor, the manufacturer may desire to display the manufacturer's brand or perhaps a vendor (e.g., vendor with a strong reputation) of the keyboard's brand on the keyboard when the device is in use, which may be especially true as displays get larger and the physical bezel around the display gets smaller, making it more difficult for the manufacturer to display their branding in a visible location on the front of the device. In addition, some devices may allow users to install a virtual keyboard from any supplier it desires and that supplier may wish to brand the virtual keyboard so the user is aware of the supplier of the keyboard.

Figure 1:
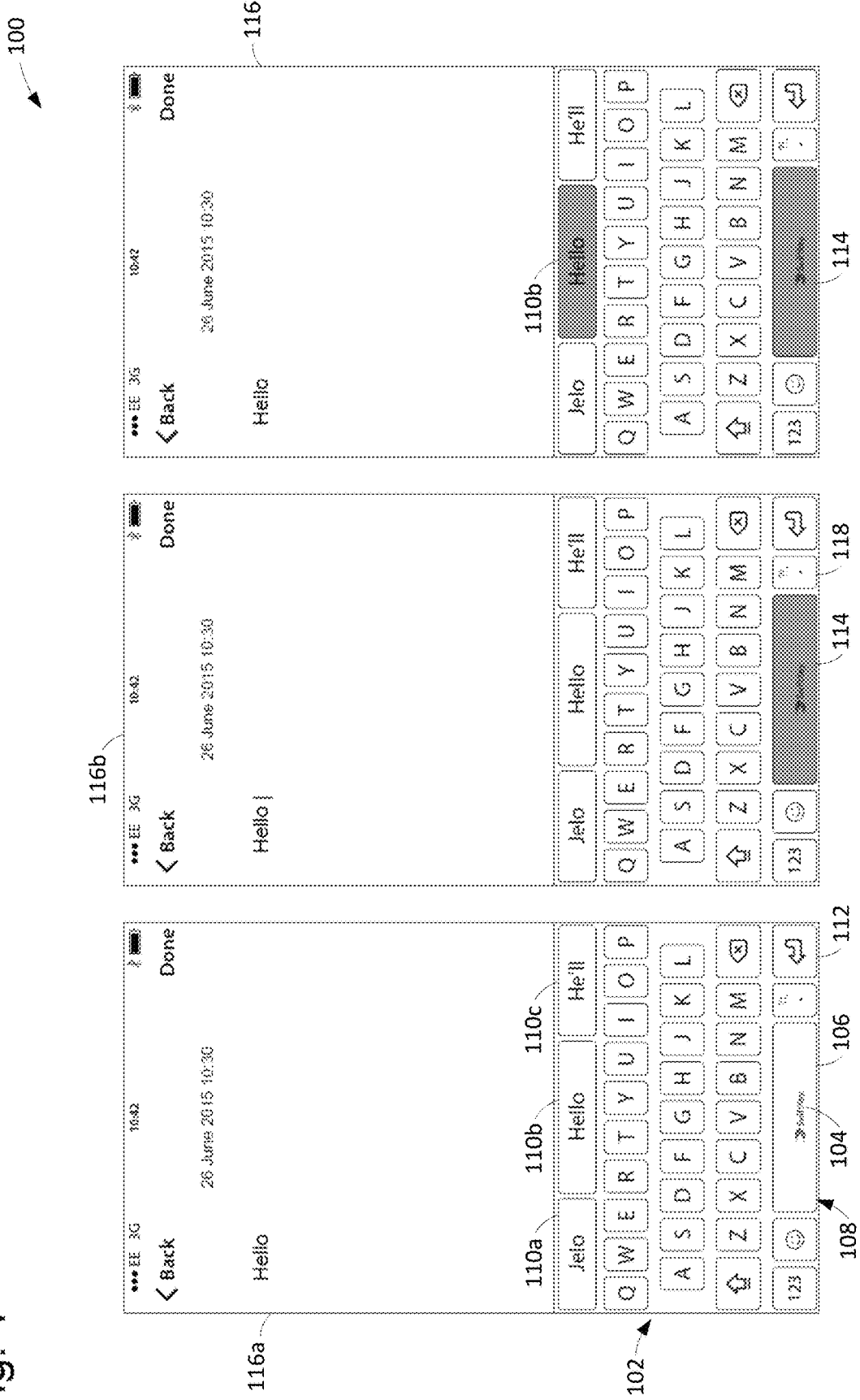
FIG. 1 illustrates an embodiment of a brand animation associated with a space bar's utilization.

As noted above, while brands can be added to unused portions of the keyboard as it is displayed or on one or more keys, such as a space bar, doing so may draw little attention to the brand. In an embodiment of the present disclosure, as illustrated in FIG. 1, three screens or displays 116 with associated keyboards 102 of a device 100 are illustrated. A low visibility version 108 of a brand 104 (e.g., faded, black & white, small), consisting of the SWIFTKEY logo and word mark, is displayed on a key (e.g., the space bar 106) and temporarily animated to a high visibility version 114 (e.g. by glowing/enlarging/changing color) when one of a pre-determined set of keys is pressed (e.g. the space bar 106 itself, a prediction candidate key 110 (110a, 110b, and/or 110c), the return key 112, or any key on the keyboard 102). In some cases, the brand 104, in one or more versions, such as version 108, may include or be represented by a mnemonic device. Further animations could be used, such as movement could also be added. Regardless of the animation used, it should be noted that the key upon which the brand 104 is located and animated has nothing to do with the depicted brand itself and the brand 104 is not relevant to the function of the key being activated, even though it may be located on the key. For example, the space bar 106 is generally used for adding a space while typing text, although additional tasks can be performed through the space bar 106, as further described, none of which has anything to do with the depicted brand. Likewise, prediction candidate keys or buttons 110, return key and other keys used for other purposes have nothing to do with the brand, such that the brand 104 is just an added mnemonic device to the other information already presented on the keyboard 102.

In the embodiment depicted in FIG. 1, the keyboard 102 may initially display the brand 104 in a first appearance, size, and position or version 108 when the device 100 is first started or activated. After a defined period of time with no activity, the brand 104 may be animated to a second appearance, size, and position after a defined period of time. When the spacebar 106 is pressed, the brand 104 may be animated to a third appearance or version 114, size and position, which may be the same as the first appearance or version 108 or it may be different. When the spacebar 106 is released, the logo may return to the second appearance, size and position, in time with changes to the underlying key, which might be highlighted in some way when it is pressed, such as by changing the color of the underlying key as it is pressed and changing the color back to indicate an unpressed or unselected appearance.

As particularly illustrated in FIG. 1, the screen on the left 116*a* illustrates the screen after a user has typed the word "Hello" on the keyboard 102, which is displayed on the display screen. The left screen 116*a* illustrates the brand 104 in its idle position or first version 108. The middle screen 116*b* of FIG. 1 illustrates the brand 104 in a third appearance or version 114 as the spacebar 106 is selected by a user, with the brand 104 being animated to be brighter/whiter in order to be more visible. The right screen 116*c* of FIG. 1 illustrates the brand 104 in the same third appearance 114 as the candidate bar 110*b* or space bar 106 is selected to insert the candidate work "Hello" into the text area of the display screen.

Additional embodiments of the present disclosure include:

Animating the brand 104 whenever the keyboard 106 is opened or pressed.

Animating the brand 104 when the prediction candidate keys 110 are pressed.

Animating the brand 104 when the return key 112 or punctuation keys 118 are pressed (i.e., when candidates are inserted).

Animating the brand 104 by changing colors, e.g., from greyscale or single color to multiple colors, and back again.

Animating the brand 104 differently, e.g. by enlarging it whilst it glows, and reducing its size as it fades.

Animating the brand 104 by changing its position and/or rotation, and/or size at opening or press of the space bar 106.

Animating the brand 104 when other keys of keyboard 102 are pressed, e.g. character/symbol keys, settings keys.

Positioning the brand 104 elsewhere, e.g., on a different key.

Using a different or multiple brand (e.g., text only, graphical only).

Fading out the brand 104 entirely after the animation.

Figure 2A:
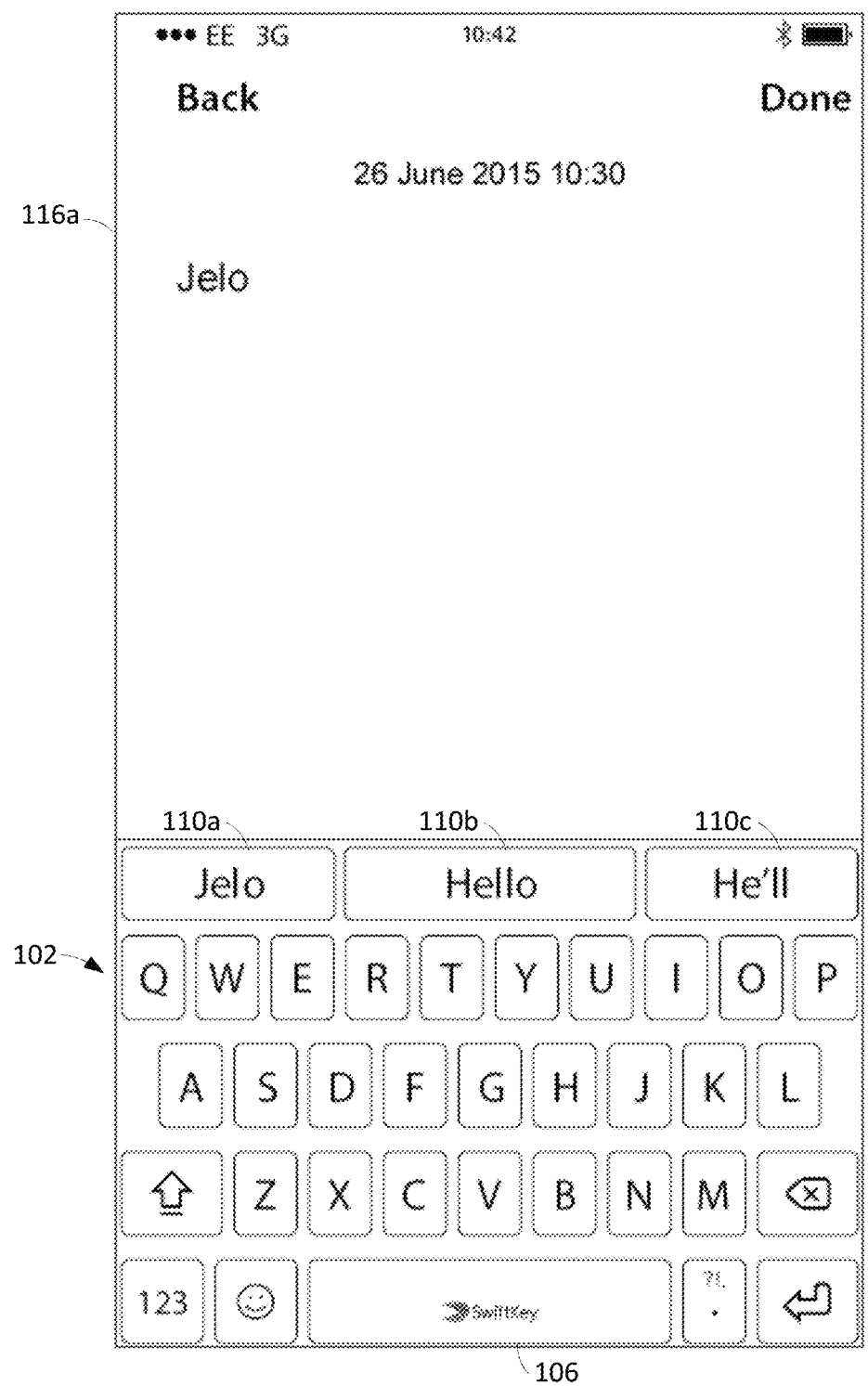
FIG. 2A illustrates a key of a virtual keyboard with a key having a shared state with a candidate button and a non-shared state when the key is in a non-shared display state.
Figure 2B:
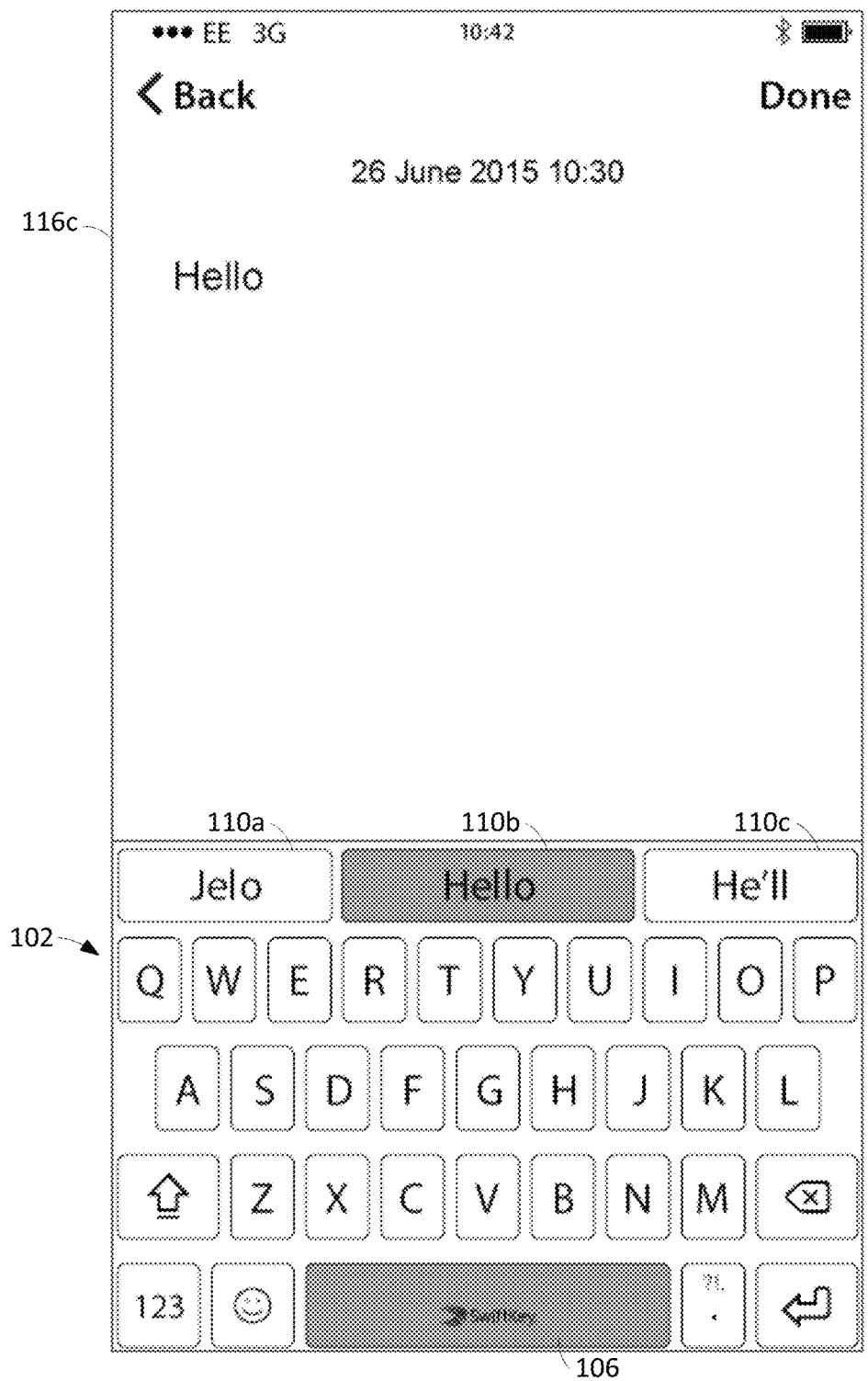
FIG. 2B illustrates a key of a virtual keyboard with a key having a shared state with a candidate button and a non-shared state when the key is in a shared display state.
Figure 2C:
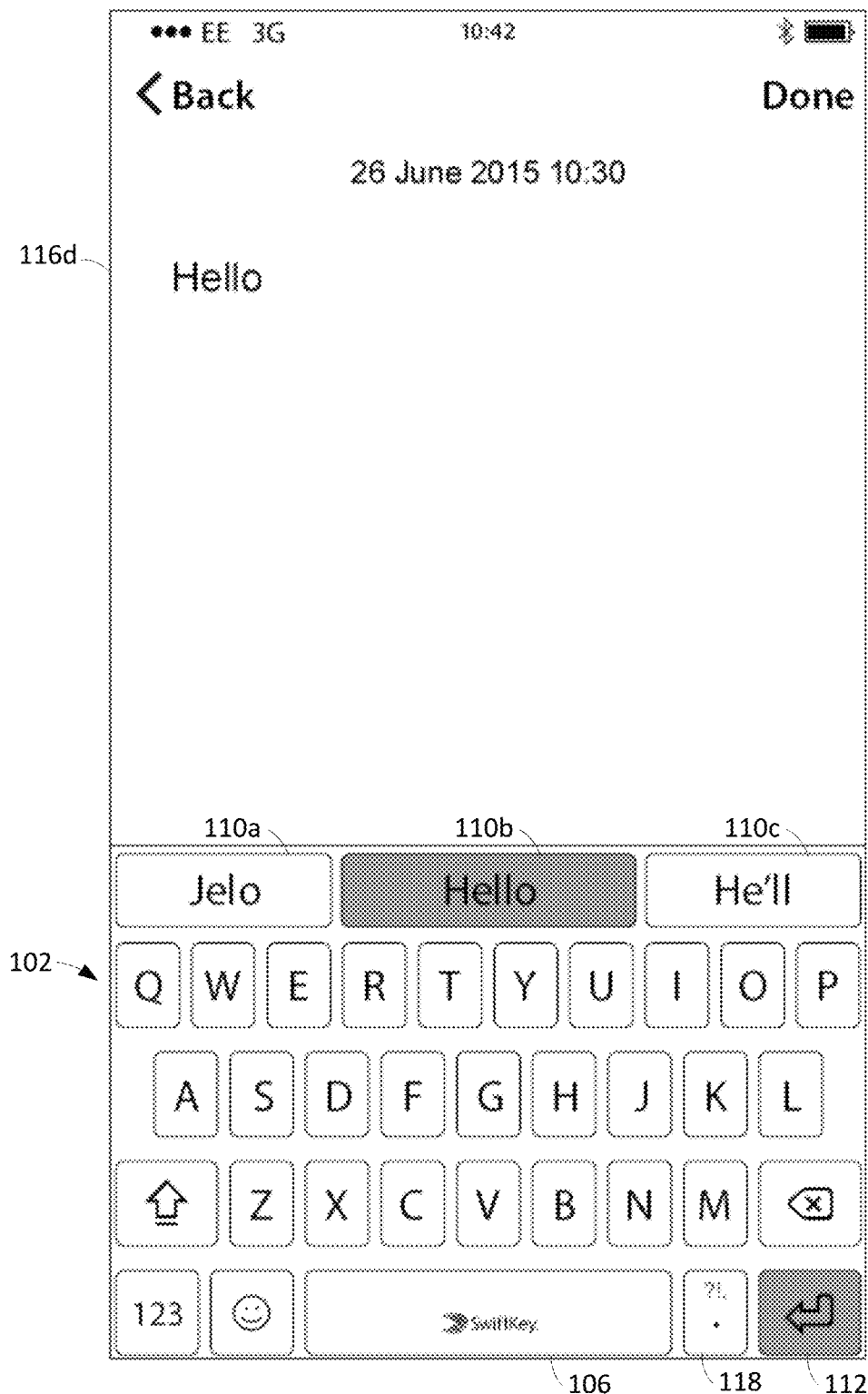
FIG. 2C illustrates an alternative key used in place of the key illustrated in FIG. 2B.

FIGS. 2A, 2B and 2C illustrate an embodiment that serves to draw a user's attention to the keys in a different way. In this embodiment, rather than illustrate a brand that is not relevant to the function of the key, one or more keys may be used to complete a task that is not part of the primary function of the key. For example, the spacebar 106 may be shared with the candidate button 110, such that selecting the space bar 106 will cause the candidate 110 to be inserted, as well as inserting a space, punctuation, a new-line, etc. Each candidate button 110 may display, and upon selection, cause a word completion, new predicted word, string of characters, symbols, emoji, emoticons, phrases, sequence of words, etc., to be entered. This embodiment may include the spacebar 106 and the candidate button 110 being highlighted at the same time, so it is more obvious to a user that the spacebar 106 or the candidate bar 110 may be used to insert the candidate. This may be particular useful to users that hold the computing device 100 at its lower end when typing and do not want to move their hands to select a candidate button 110.

In such an embodiment, one or more keys of the virtual keyboard 102 may be employed to perform a task that is otherwise not relevant to the key's primary function. In the embodiment, when a key, such as the spacebar 106, is in a shared state with the candidate button 110, the spacebar 106 and the candidate button 110 may be shown in its pressed state (e.g., visual representation of the key during a tap or tap and hold gesture) to reinforce that either the spacebar 106 or the candidate button 110 may be pressed to insert the top candidate. In some cases, the shared state may occur before any keys are pressed, or when one of the shared keys is pressed (e.g., in this example, a candidate button 110 and the spacebar 106). The top candidate may be consistently associated with one of candidate keys 110*a*, 110*b*, 110*c*, such as candidate key 110*b*, as illustrated. When the spacebar 106 is not shared with the candidate button 110, the spacebar 106 may be shown in its normal state. Sharing the state of both keys at the same time re-enforces the concept that both buttons perform the same action, and pressing one is the same as pressing the other (though not necessarily the other way round, e.g., as the spacebar 106 may sometimes be used to simply insert a space such as when the top candidate 110*b* is a prediction and not a correction or completion). Holding down on either key may continuously highlight both.

In some aspects, the shared keys, such as the spacebar 106 and a candidate key 110*b*, may share one or more visual characteristic before either key is pressed, to indicate an association between the keys. This, for example, may include highlighting each of the shared keys with a certain color, pattern, highlighting, border, etc., that may differentiate the shared keys from the rest of the keys (e.g., other candidates keys 110*a* and 110*c* and other keys) displayed on the virtual keyboard 102.

In accordance with the embodiment, when a first key on a virtual keyboard 102 that performs the same action as a second candidate insertion key is pressed, the second candidate insertion key is simultaneously animated in the same way as the first key (e.g., displaying the pressed state as if it were the key being pressed). In some aspects, the pressed state animation or visual representation of the shared keys may differ from the un-pressed or unselected visual representation of the shared keys. This is illustrated in FIGS. 2A, 2B and 2C. In FIG. 2A, the screen 116*a* is shown in its default state, where no keys are currently being pressed or selected. In FIG. 2B, during a key press of the space bar 106, both the candidate button 110*b* and the spacebar 106 are highlighted to indicate that either may be used to insert the candidate word, as well as a space following the candidate word (pressing the top candidate key/button 110*b* would also result in a space being inserted). The state 116*c* of the keyboard 102 in FIG. 2B may also display the candidate key 110*b* being pressed or otherwise selected/in a selected state, and simultaneously highlighting the space bar 106 to show that pressing the space bar 106 performs the same function as the candidate key 110*b*. In FIG. 2C, the return key 112 visually shares a highlighted state with the candidate button 110*b* instead of the spacebar 106 when the return key 112 is pressed or selected, indicating that the return key 112 will insert the candidate word in the same manner as pressing the candidate button 110*b*, but insert a new line instead of a space as would the space bar 106.

FIG. 2C serves to further illustrate that the sharing of the press state is potentially applicable to any keys that perform the same action as the candidate key 110 at that point in time, e.g., spacebar 106, return key 112, punctuation key 118, etc. Also, these keys do not necessarily have to perform the same function as the candidate key 110 all the time (or potentially even at the same time as each other). In an embodiment, the spacebar 106, return key 112, and punctuation keys 118 may insert the top candidate (plus a space, a new line, or some punctuation) when the candidate word is a correction or completion, but not a next word candidate without any initial input characters. In accordance with other embodiments, the press state visualization could mean different things in different embodiments, e.g. highlight, color, 3D movement up/down, etc. In addition, the press state could work differently for different keys in the same embodiment, e.g., candidate key 110 has one animation, space bar 106 has another, and return key 112 has yet another.

Figure 3:
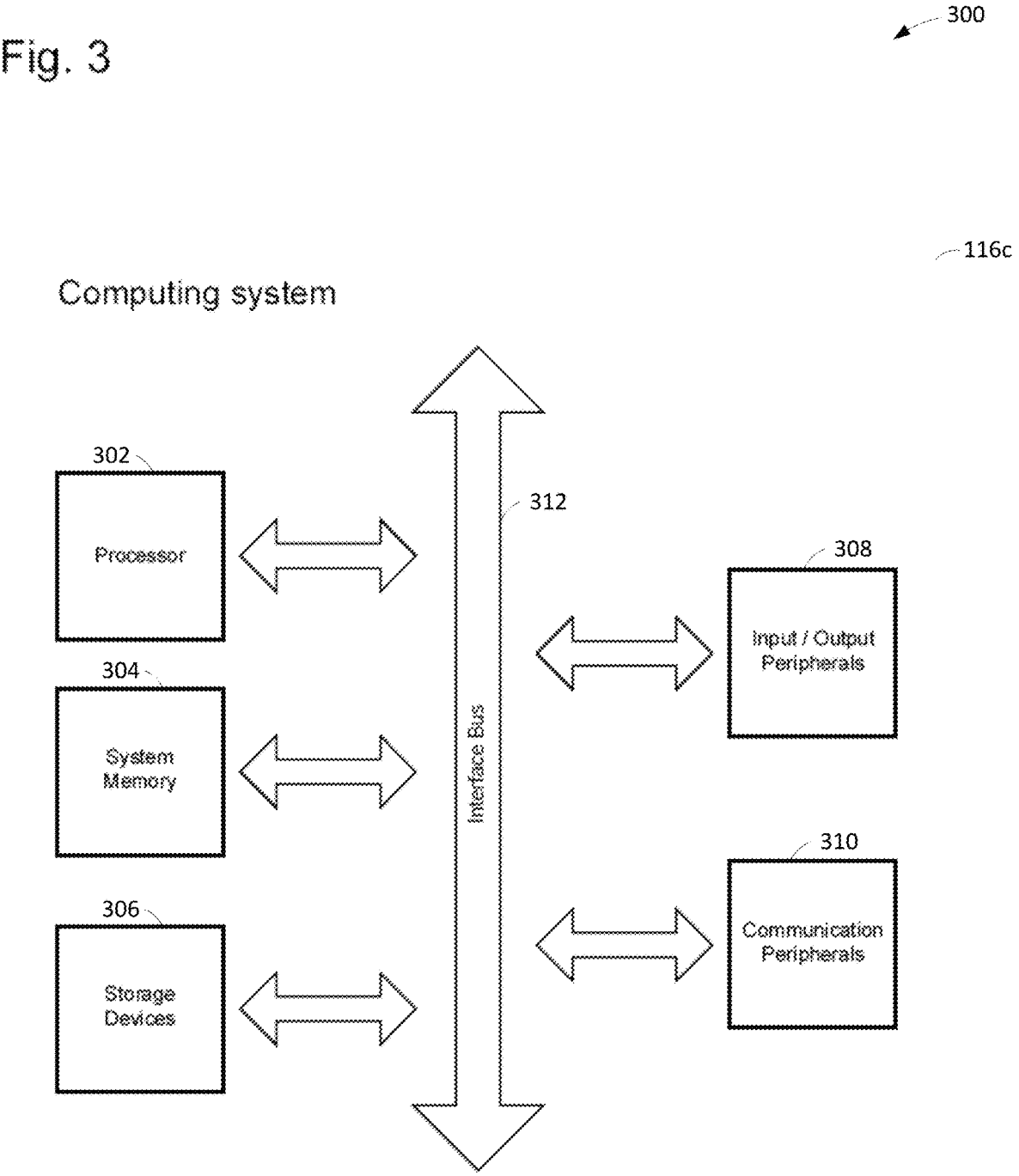
FIG. 3 illustrates an embodiment of a computing system.

As illustrated in FIG. 3, the methods and techniques described above may be implemented on a computing device or system 300 associated with a user, which may include one or more aspects of computing device 100 described above, a plurality of computing devices 300 associated with a plurality of users, a server in communication with the computing device(s) 300, or a plurality of servers in communication with the computing device(s) 300. Additionally, the techniques may be distributed between the computing device(s) 300 and the server(s).

In an embodiment, a non-transitory computer readable storage medium may comprise instructions that, when executed on a system are configured to operate the virtual keyboard 102 as described herein. FIG. 3 describes one embodiment of a computing system 300 on which such a virtual keyboard 102 may operate. The computing system 300 may include hardware modules, software modules, and/or a combination thereof that can be implemented as a computing device, such as device 100, of a user.

In a basic configuration, the computing system 300 may include at least a processor 302, a system memory 304, a storage device 306, input/output peripherals 308, communication peripherals 310, and an interface bus 312. The interface bus 312 is configured to communicate, transmit, and transfer data, controls, and commands between the various components of the computing system 300. The system memory 304 and the storage device 306 comprise computer readable storage media, such as RAM, ROM, EEPROM, hard-drives, CD-ROMs, optical storage devices, magnetic storage devices, flash memory, and other tangible storage media. Any of such computer readable storage medium can be configured to store instructions or program codes embodying aspects of the disclosure. Additionally, the system memory 304 comprises an operation system and applications. The processor 302 is configured to execute the stored instructions and can comprise, for example, a logical processing unit, a microprocessor, a digital signal processor, and the like.

Further, the input and output peripherals 308 include user interfaces such as a screen, microphone, speaker, other input/output devices, and computing components such as digital-to-analog and analog-to-digital converters, graphical processing units, serial ports, parallel ports, universal serial bus, transmitter, receiver, and so on. The input/output peripherals 308 may be connected to the processor 302 through any of the ports coupled to the interface bus 312.

The user interfaces can be configured to allow a user of the computing system 300 to interact with the computing system. For example, the computing system 300 may include instructions that, when executed, cause the computing system 300 to generate a user interface that the user can use to provide input to the computing system 300 and to receive an output from the computing system 300. This user interface may be in the form of a graphical user interface that is rendered at the screen and that is coupled with audio transmitted on the speaker and microphone and input received at the keyboard. In an embodiment, the user interface can be locally generated at the computing system 300. In another embodiment, the user interface may be hosted on a remote computing system and rendered at the computing system 300. For example, the server may generate the user interface and may transmit information related thereto to the computing device 300 that, in turn, renders the user interface to the user. The computing device 300 may, for example, execute a browser or an application that exposes an application program interface (API) at the server to access the user interface hosted on the server.

Finally, the communication peripherals 310 of the computing system 300 are configured to facilitate communication between the computing system 300 and other computing systems (e.g., between the computing device and the server) over a communications network. The communication peripherals 310 include, for example, a network interface controller, modem, various modulators/demodulators and encoders/decoders, wireless and wired interface cards, antenna, and the like.

The communication network includes a network of any type that is suitable for providing communications between the computing device 300 and the server and may comprise a combination of discrete networks which may use different technologies. For example, the communications network includes a cellular network, a Wi-Fi/broadband network, a local area network (LAN), a wide area network (WAN), a telephony network, a fiber-optic network, or combinations thereof. In an example embodiment, the communication network includes the Internet and any networks adapted to communicate with the Internet. The communications network may be also configured as a means for transmitting data between the computing device and the server.

The techniques described above may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope the disclosures herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the disclosures herein. The accompanying claims and their equivalents are intended to cover such forms or modifications as would fall within the scope and spirit of certain of the disclosures herein.

What is claimed:

1. A computing device for displaying a virtual keyboard user interface, the computing device comprising:
    a processor coupled to memory, the memory storing instructions, which when executed by the processor, cause the processor to generate a plurality of keys of a virtual keyboard for presentation on a display including:
    a first key among the plurality of keys, the first key selectable for performing a first function and a a second function different from the first function, wherein the first key has a first display state and a second display state different than the first display state, wherein the first key has the second display state upon selection for performance of the second function; and
    a second key among the plurality of keys selectable for performing the second function and a third function differing from the first and second functions, wherein the second key has a third display state and a fourth display state different than the third display state, and wherein the second key has the fourth display state upon selection for performance of the second function, and wherein the second display state and the fourth display state include a shared visual indication,
    wherein, the first key has the first display state before the second key is selected and in response to the second key being selected by a user selection of the second key for performance of the second function, the first key is changed to having the second display state and the first key and the second key are displayed with the shared visual indication.

2. The computing device as recited in claim 1, wherein the first key and the second key have an unshared state where the first key is in the second display state while the second key is in the third display state or the first key is in the first display state while the second key is in the fourth display state and wherein use of the first key only performs the first function and use of the second key only performs the second function.

3. The computing device as recited in claim 1, wherein use of the second key when the first key and second key are in the shared state will result in performance of the second function.

4. The computing device as recited in claim 3, wherein the first function is performed after the second function is performed when the first key and the second key are in the shared state and either the first key or the second key is used.

5. The computing device as recited in claim 1, wherein the first function is performed after the second function is performed when the first key and the second key are in the shared state and either the first key or the second key is used.

6. The computing device as recited in claim 2, wherein the first key and the second key are in the unshared state when the first function is a punctuation, spacing or return function and the second function is a word prediction.

7. The computing device as recited in claim 1, wherein the first key and the second key are in the shared state when the first function is a punctuation, spacing or return function and the second function is a word correction or a word completion.

8. The computing device as recited in claim 1, wherein the first function is unrelated to the second function.

9. The computing device as recited in claim 1, wherein the second key is a candidate key depicting at least one word, symbol or string of characters predicted to be typed, and wherein selection of the candidate key results in the at least one word, symbol, or string of characters being inserted into a display screen of the computing device.

10. A non-transitory computer-readable medium comprising instructions, that when executed by a computing device having a touchscreen display, cause the computing device to perform operations of:
    generating a plurality of keys of a virtual keyboard user interface for presentation on the touchscreen display;
    displaying on the touchscreen display, a first key among the plurality of keys selectable for performing a first function and a second function different from the first function, wherein the first key has a first display state and a second display state different than the first display state, and wherein the first key has the second display state upon selection for performance of the second function; and
    displaying on the touchscreen display, a second key among the plurality of keys selectable for performing a third function differing from the first and second functions, wherein the second key has a third display state and a fourth display state different than the third display state, and wherein the second key has the fourth display state upon selection for performance of the second function, and wherein the second display state and the fourth display state include a shared visual indication;
    wherein, the first key has the first display state before the second key is selected and in response to the second key being selected by a user selection of the second key for performance of the second function, the first key is changed to having the second display state and the first key and the second key are displayed with the shared visual indication.

\* \* \* \* \*